(12) United States Patent
Cook et al.

(10) Patent No.: US 9,961,828 B2
(45) Date of Patent: May 8, 2018

(54) CUTTER GUARD ASSEMBLY COVER OF A HEADER FOR AN AGRICULTURAL FARM IMPLEMENT

(71) Applicant: CNH Industrial America LLC, New Holland, PA (US)

(72) Inventors: Joel T. Cook, Lititz, PA (US); Andrew V. Lauwers, Sandusky, OH (US); Craig D. Roberts, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days. days.

(21) Appl. No.: 14/890,360

(22) PCT Filed: May 8, 2014

(86) PCT No.: PCT/US2014/037338
§ 371 (c)(1),
(2) Date: Nov. 10, 2015

(87) PCT Pub. No.: WO2014/182926
PCT Pub. Date: Nov. 13, 2014

(65) Prior Publication Data
US 2016/0135366 A1 May 19, 2016

Related U.S. Application Data

(60) Provisional application No. 61/846,778, filed on Jul. 16, 2013, provisional application No. 61/834,911, (Continued)

(51) Int. Cl.
*A01D 34/04* (2006.01)
*A01D 34/30* (2006.01)
(Continued)

(52) U.S. Cl.
CPC ............. *A01D 34/04* (2013.01); *A01D 34/30* (2013.01); *A01D 41/14* (2013.01); *A01D 75/185* (2013.01); *A01D 2101/00* (2013.01)

(58) Field of Classification Search
CPC ...... A01D 34/04; A01D 34/135; A01D 34/14; A01D 34/145; A01D 34/16; A01D 34/30;
(Continued)

(56) References Cited

U.S. PATENT DOCUMENTS 157,344 A * 12/1874 Myers .................. A01D 34/145
56/303
817,523 A * 4/1906 Soott ...................... A01D 34/30
30/224
(Continued)

FOREIGN PATENT DOCUMENTS

DE 2130216 A1 12/1972
GB 2103063 A 2/1983

*Primary Examiner* — Robert E Pezzuto
*Assistant Examiner* — Adam J Behrens
(74) *Attorney, Agent, or Firm* — Peter K. Zacharias; Patrick M. Sheldrake

(57) ABSTRACT

A cutter guard assembly for a knife drive of an agricultural farm implement is provided. The cutter guard assembly includes a cutter bar assembly, a floor assembly and a knife assembly. The cutter bar assembly has a cutter bar. The floor assembly includes a floor extending from the cutter bar and a cover extending from the floor. The knife assembly is covered by and situated below the floor assembly. In operation the cover drapes over a rigid frame of a header shielding the knife assembly from debris.

20 Claims, 20 Drawing Sheets

Related U.S. Application Data filed on Jun. 14, 2013, provisional application No. 61/822,074, filed on May 10, 2013.

(51) Int. Cl.
*A01D 41/14* (2006.01)
*A01D 75/18* (2006.01)
*A01D 101/00* (2006.01)

(58) Field of Classification Search
CPC ........ A01D 34/32; A01D 41/14; A01D 75/10; A01D 75/12; A01D 75/185
See application file for complete search history.

(56) References Cited

U.S. PATENT DOCUMENTS

| | | | |
|---|---|---|---|
| 1,199,678 A * | 9/1916 | Elliason | A01D 34/30 56/296 |
| 1,622,299 A | 3/1927 | Wanamaker | |
| 2,332,840 A | 10/1943 | Boyer | |
| 2,515,343 A * | 7/1950 | Gravely | A01D 34/08 37/264 |
| 2,540,616 A * | 2/1951 | Hasslacher | A01D 34/30 30/223 |
| 3,114,230 A * | 12/1963 | Blaauw | A01D 34/135 56/297 |
| 4,198,803 A * | 4/1980 | Quick | A01D 34/13 56/296 |
| 4,199,925 A | 4/1980 | Quick et al. | |
| 4,722,172 A * | 2/1988 | Pearce | A01D 34/13 56/14.4 |
| 4,891,932 A | 1/1990 | Johnson | |
| 7,401,458 B2 | 7/2008 | Priepke | |
| 7,520,118 B1 | 4/2009 | Priepke | |
| 7,730,709 B2 | 6/2010 | Priepke | |
| 7,805,919 B2 | 10/2010 | Priepke | |
| 7,810,304 B2 * | 10/2010 | Priepke | A01D 34/30 56/257 |
| 7,975,607 B2 | 7/2011 | Hoover et al. | |
| 8,011,272 B1 | 9/2011 | Bich et al. | |
| 8,151,547 B2 * | 4/2012 | Bich | A01D 34/145 56/158 |
| 8,601,780 B2 | 12/2013 | Schmidt et al. | |
| 9,192,097 B2 * | 11/2015 | Cook | A01D 34/30 |
| 2007/0204586 A1 | 9/2007 | Coers | |
| 2010/0095646 A1 * | 4/2010 | Schmidt | A01D 41/14 56/14.3 |
| 2011/0078989 A1 * | 4/2011 | Bich | A01D 34/145 56/14.5 |
| 2014/0059995 A1 * | 3/2014 | Cormier | A01D 43/06 56/181 |
| 2014/0090346 A1 * | 4/2014 | Wilbert | A01D 34/145 56/257 |
| 2014/0109540 A1 | 4/2014 | Cook | |
| 2014/0165526 A1 * | 6/2014 | Leys | A01D 41/14 56/181 |
| 2014/0196427 A1 * | 7/2014 | Fuechtling | A01D 41/14 56/181 |
| 2014/0318094 A1 | 10/2014 | Cook et al. | |
| 2014/0345239 A1 | 11/2014 | Cook et al. | |

* cited by examiner

CUTTER GUARD ASSEMBLY COVER OF A HEADER FOR AN AGRICULTURAL FARM IMPLEMENT

This application is the US National Stage filing of International Application Ser. No. PCT/US2014/037338, filed on May 8, 2014 which claims priority to International Application No. PCT/US2014/035866, filed on Apr. 29, 2014, U.S. Provisional Applications with Ser. Nos. 61/822,074, filed May 10, 2013, 61/834,911, filed Jun. 14, 2013, and 61/846,778, filed Jul. 16, 2013 each of which is hereby incorporated by reference in its entirety.

BACKGROUND OF THE INVENTION

The present embodiments of the subject invention relate generally to a header for an agricultural farm implement. In particular, the present embodiments relate to a cutter guard assembly cover for a header of an agricultural farm implement e.g., a cover for a floor sheet of a cutter guard assembly. The present embodiments also relate to a cutting assembly that is associated with an agricultural equipment, and in particular to a protection that mitigates contact of foreign objects (e.g., crop residue/crop, stone, pebbles, soil, crop/crop and the like) with a knife arm of such cutting assembly.

Mechanical harvesting of crops and processing of crop material e.g., hay, grasses, small grains and the like has taken place for decades. However, efforts continue in the attempt to make harvesting and processing operations more efficient and effective. This is typically accomplished with farm implements such as mechanical harvesters, a hay head, windrowers, etc. Exemplary farm implements include an agricultural combine having a header which cuts the crop. The header then moves the cut crop into a feeder house. The feeder house lifts the cut crop into the threshing, separation and cleaning areas of the agricultural combine. An operator usually runs these various operations from a glass-enclosed cab.

Certain farm implements have headers such as a draper header or windrower. Conventional draper headers include a floor assembly typically mounted adjacent a rigid frame of the combine harvester and extending in a widthwise direction. The floor assembly typically includes a plurality of floor sheets or a floor pan. The floor assembly defines the lower periphery of a cut crop or plant flow area, which can include a conveying apparatus, such as one or more augers or belts, operable in cooperation with a reel in machines so equipped, for conveying the cut plant material and crops, for instance to a feeder inlet of a combine or windrow forming apparatus of a windrower.

Conventional draper headers further include a knife assembly typically supported along a forward edge portion of the floor assembly extending in a widthwise direction of the combine. The reciprocating knife assembly is typically oriented so as to extend sidewardly along the forward edge portion of the floor assembly (running in a widthwise direction of the combine). The knife assembly typically includes sickles or knives supported by a cutter bar assembly. In general, such sickles or knives are mounted in a side by side relation forming an elongate metal knife or reciprocating assembly. The reciprocating knife assembly is normally supported so as to slide longitudinally along the cutter bar assembly that has forwardly projecting, spaced apart guards bolted to a structural beam or knife back. The reciprocating assembly moves back and forth in a reciprocating movement to move the knives relative to the guards so that a leading knife edge of the knives cross over the guards or though slots in the guards. This produces a shearing or cutting action which severs plant stems and stalks or other material captured between the knives and guards.

Conventional draper headers further include a knife drive. Some knife drives are located on the side end of the sickle or knife and connect to the knife assemblies utilizing connecting rods or Pitman arms, such as described in U.S. Pat. Nos. 1,622,299 and 2,332,840. Other knife drives are located in or below the floor of a header and are sometimes referred to as center knife drives, as disclosed in U.S. Pat. Nos. 7,810,304; 7,805,919; 7,730,709; 7,520,118; 7,401,458; 8,011,272; and 8,151,547 the entire disclosures of which are hereby incorporated by reference herein. Advantages of center knife drives can include compactness, efficiency, and manner of translating epicyclic or crank motion to side to side knife motion.

Such headers of agricultural farm implements equipped with center knife drives are used for cutting large quantities of crop material. In doing so, however, excessive amounts of material collect on the surfaces of the knife assembly's gear box and lead to operational failure of the header. As a result, the collection of material of these components must be cleaned out on a regular basis during operation in order to ensure proper operation of the header and prevention of mechanical failure of the header, which is a time consuming and costly process.

Accordingly, a need still exists for a cutter guard assembly to address the foregoing issues of conventional headers of farm implements. Such needs are satisfied by the present invention.

BRIEF SUMMARY OF THE INVENTION

In accordance with a preferred embodiment the present invention provides a cutter guard assembly for a header of an agricultural farm implement. The cutter guard assembly includes a cutter bar assembly, a floor assembly and a knife assembly. The floor assembly includes a floor extending rearwardly from the cutter bar assembly and a cover extending rearwardly from the floor. The knife assembly is operatively connected to the cutter bar assembly. A center knife drive is operatively connected to the knife assembly.

In accordance with another preferred embodiment the present invention provides a header for an agricultural farm implement that includes a rigid frame, a cutter bar assembly, a knife assembly and a floor assembly. The cutter bar assembly is mounted to the header adjacent to the rigid frame. The knife assembly is operatively connected to the cutter bar assembly. The floor assembly includes a floor extending rearwardly from the cutter bar assembly and a cover extending from the floor and covering the rigid frame. The cutter bar assembly extends the width of the header and is configured as a flexible cutter bar assembly such that a section of the cutter bar assembly flexes e.g., upwards or downwards relative to a frame of the header. The flexible cutter bar assembly allows the cutter bar assembly to better adjust to changes in terrain surfaces.

In accordance with yet another preferred embodiment the present invention provides a header for an agricultural farm implement that includes a rigid frame, a cutter bar assembly, a knife assembly, a floor assembly and a protective encapsulation. The cutter bar assembly is mounted to the header adjacent the rigid frame. The knife assembly is operatively connected to the cutter bar assembly and includes a knife arm. The floor assembly includes a floor extending rearwardly from the cutter bar assembly. The protective encapsulation covers the knife arm which extends forwardly of the floor.

In accordance with another aspect of the present invention, infiltration of foreign objects, such as: loose crop material or residue and other undesirable material (e.g., dust, dirt, and debris) into various gaps or spaces of a cutting assembly of a header of an agricultural harvester can adversely affect operation of agricultural equipment.

For example, when a knife arm of the cutting assembly projects out of a floor of the header (e.g., by an opening typically wider than the knife arm), and during its pivoting operation and/or in conjunction with rotational movement of the floor, infiltration of foreign objects can occur into a gap or a space that is formed between the floor sheet and a top portion of a gear box cover (e.g., a space formed between bottom of the floor sheet and a top surface area of the gear box) that covers a gear box operatively connected to the cutting assembly. Infiltration of foreign objects into such gap or void space can adversely affect operation of the agricultural equipment.

In a related example, it is desirable that the crop remains on top of the floor for entry into the header, and infiltration of the crop into a space behind the floor and the gear box therebetween is undesirable.

Various aspects of the subject application mitigate entrance or infiltration of foreign objects into such spaces, by providing a protective boundary about a knife arm that is associated with a cutting assembly of an agricultural equipment. In one aspect, such protective boundary can be in form of a protective encapsulation (e.g., partial) around a knife arm, to mitigate entrance of foreign objects in a space between the floor and gear box. It is to be appreciated that the subject application is not so limited to such spaces, and infiltration in to other sections of the agricultural equipment can also be mitigated.

In a related aspect, a knife head can move or reciprocate underneath such protective encapsulation of the knife arm, wherein such protective encapsulation remains substantially stationary relative thereto. Moreover, the protective encapsulation or boundary can employ various surface areas and plane configurations (e.g., curved surfaces, plane curves, flat planes and the like), to further accommodate for proper movement of the floor (e.g., preserving clearance relationship requirement for proper operation) such as the minimal floor movement criteria. According to a further aspect, the protective encapsulation can be connected to the knife assembly itself and move therewith (as opposed to being stationary).

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

In accordance with yet another aspect, the present invention provides a protective encapsulation for a cutter assembly comprising surface(s) defining an encapsulation to mitigate infiltration of objects into a space as defined by a top portion of a gear box and a floor of a header that is associated with agricultural equipment. The cutter assembly comprises an elongate knife head having a plurality of holes therein arranged in a longitudinally spaced array, configured and disposed for receiving a plurality of fasteners, respectively, for attaching the knife head and a plurality of knife sections of the sickle to a structural beam of the cutter assembly. A knife arm includes a mounting end configured for attachment to a drive mechanism for reciprocating sideward movement of the knife arm therewith.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
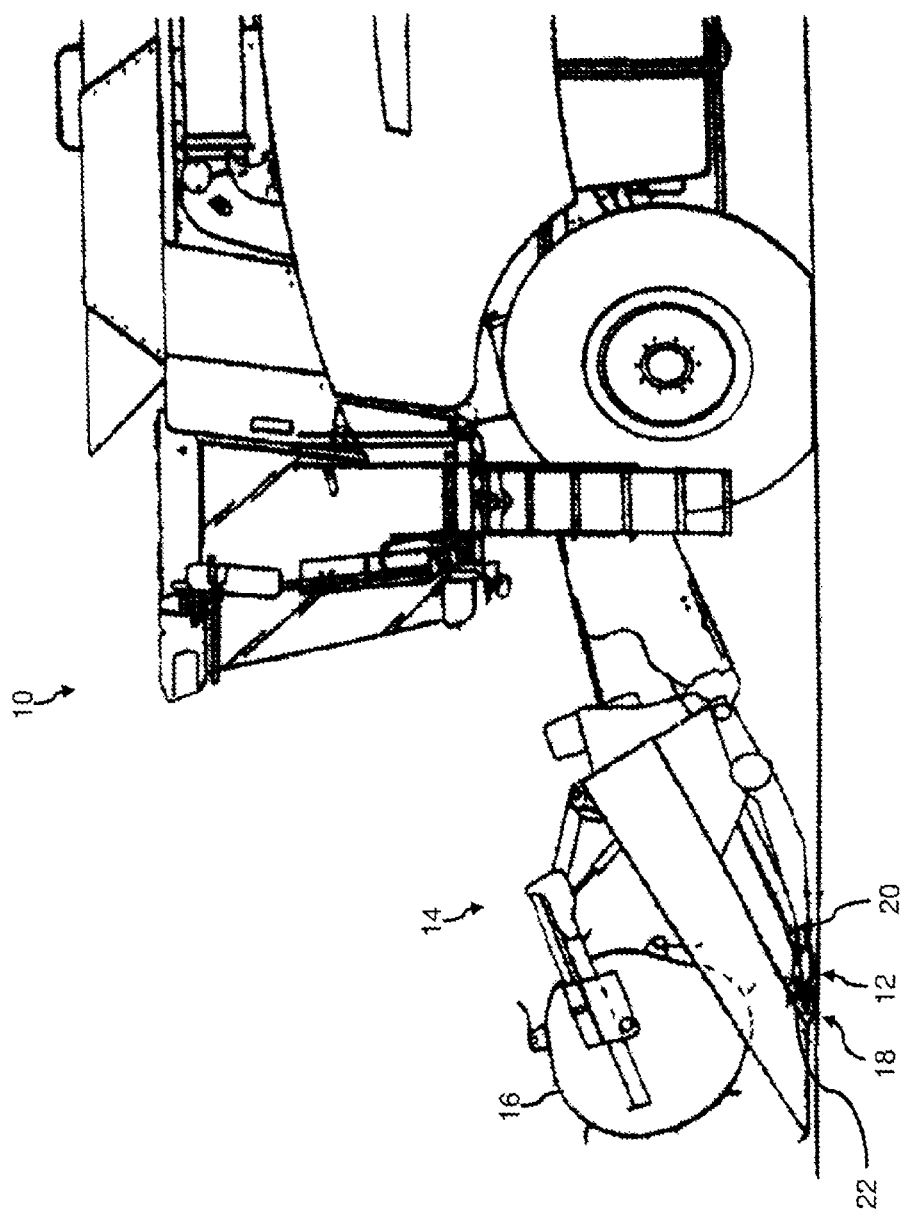
FIG. 1 is a partial left side elevation view of an agricultural combine having a header with a cutter guard assembly in accordance with a preferred embodiment of the present invention.

Reference will now be made in detail to preferred embodiments of the invention illustrated in the accompanying drawings. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain," "crop" and "crop material" are used throughout the specification for convenience and it should be understood that these terms are not intended to be limiting. Thus, "grain" or "crop" refers to that part of crop material which is harvested and separated from discardable portions of the crop material.

The disclosures of U.S. provisional application Nos. 61/822,074; 61/834,911; and 61/846,778, and International Application No. PCT/US14/35866 are hereby incorporated by reference in their entirety.

Referring now to FIGS. 1-6 there is shown a preferred embodiment of a cutter guard assembly 12 for an agricultural farm implement. For purposes of illustrating the present embodiment and not by way of limitation, the cutter guard assembly 12 will be described in connection with an agricultural combine 10 having a header 14. Further, the foregoing embodiment will herein be described with reference to a draper header having a reel 16. The cutter guard assembly 12 includes a cutter bar assembly 18, a floor assembly 20, and a knife drive assembly or knife assembly 22.

Figure 2:
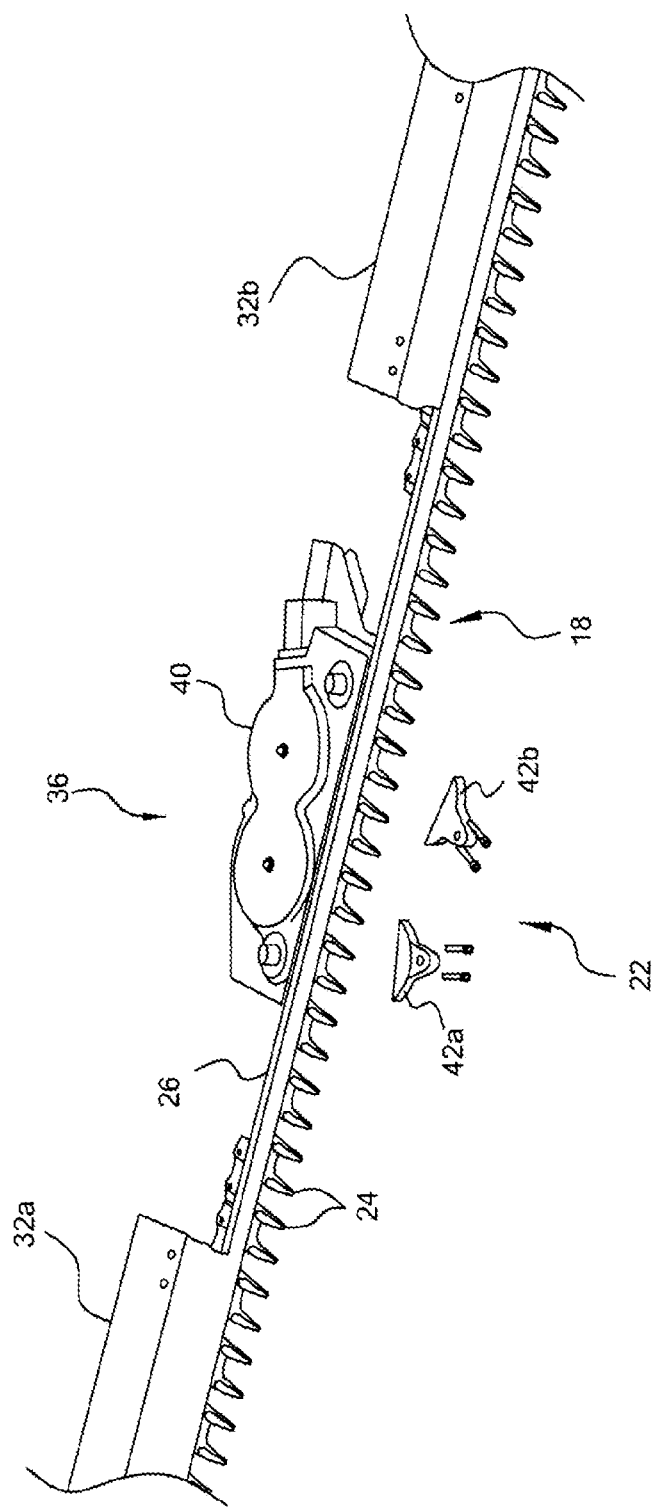
FIG. 2 is a partial exploded perspective view of the cutter guard assembly of FIG. 1 without a cover and with a segment of a floor sheet omitted.
Figure 3:
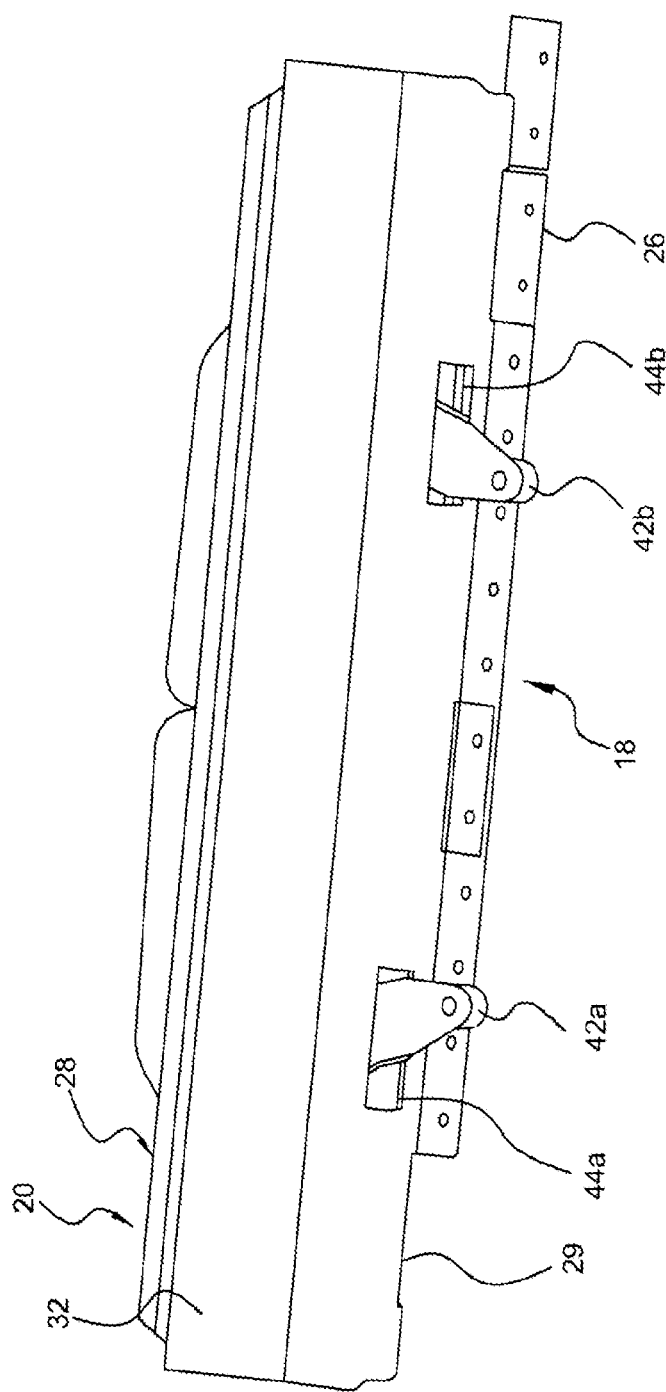
FIG. 3 is a partial perspective view of the cutter guard assembly of FIG. 1 without a cover.
Figure 4:
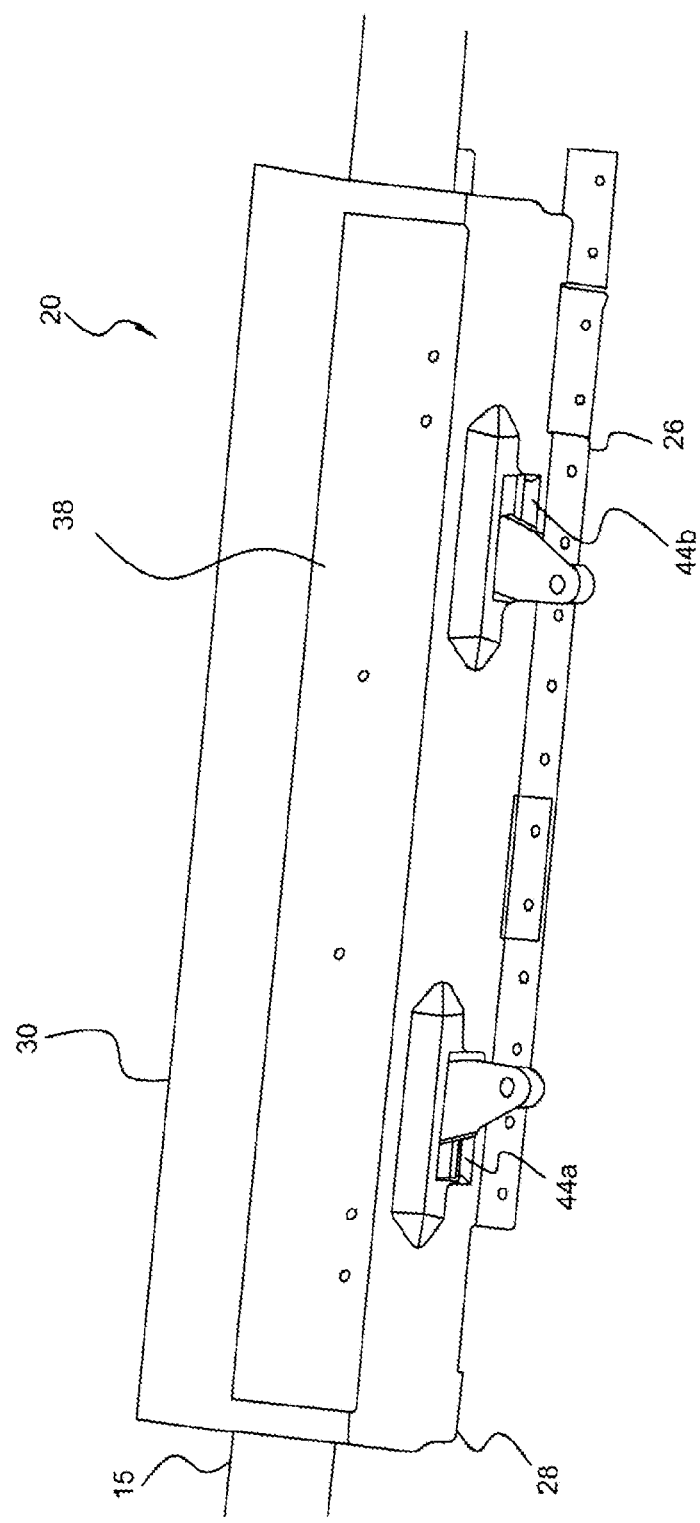
FIG. 4 is a partial perspective view of the cutter guard assembly of FIG. 3 with a cover.

The cutter bar assembly 18 is configured as best shown in FIG. 2 and includes a cutter bar 26 having an array of guards 24 sidewardly extending about a forward edge of the cutter bar 26. The array of guards 24 is intervally spaced along the cutter bar 26. Operatively attached to the cutter bar 26 is the knife assembly 22, as further discussed below.

Figure 5:
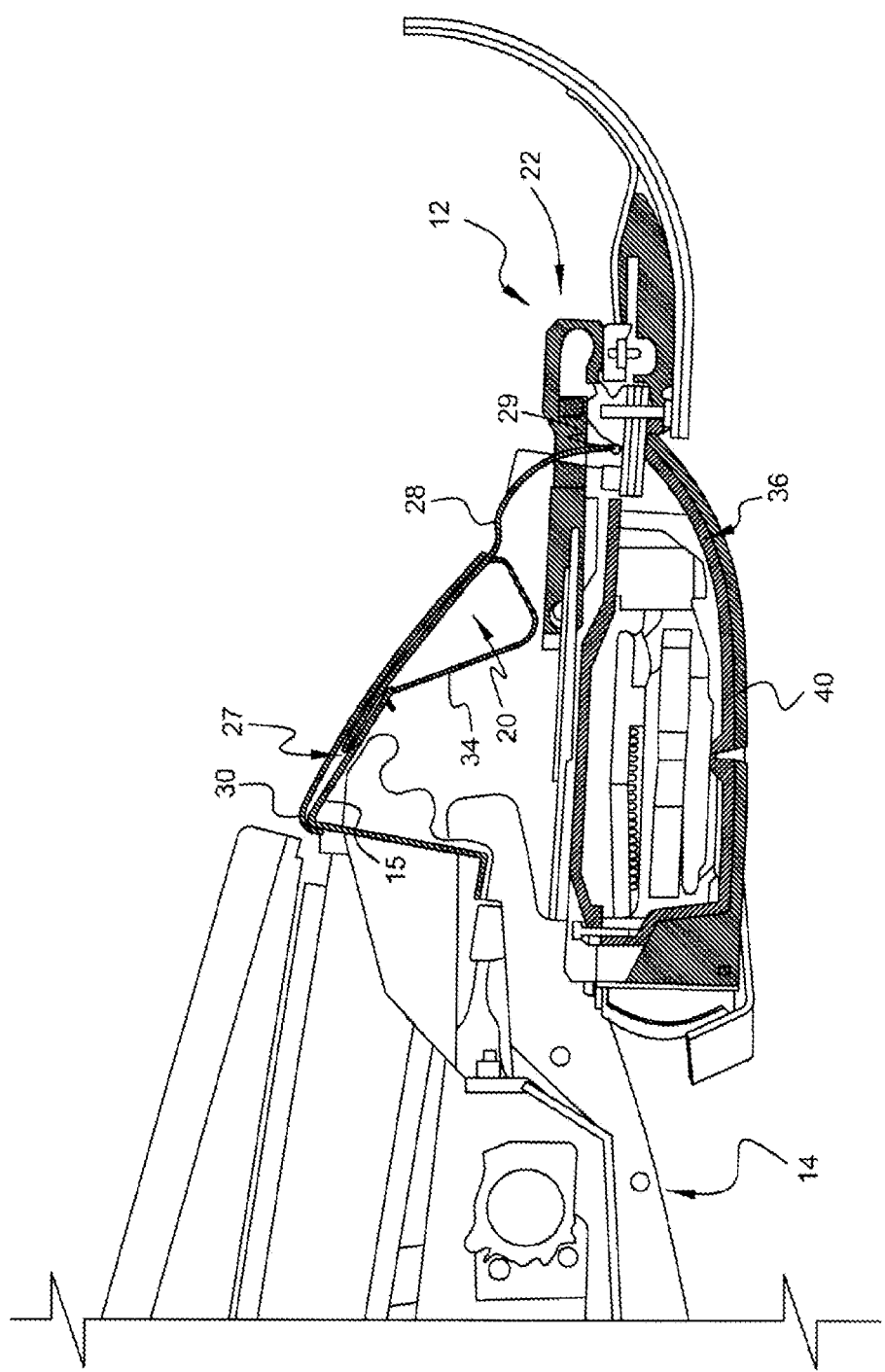
FIG. 5 is a right side cross-sectional view of the cutter guard assembly of FIG. 1 in a down position.
Figure 6:
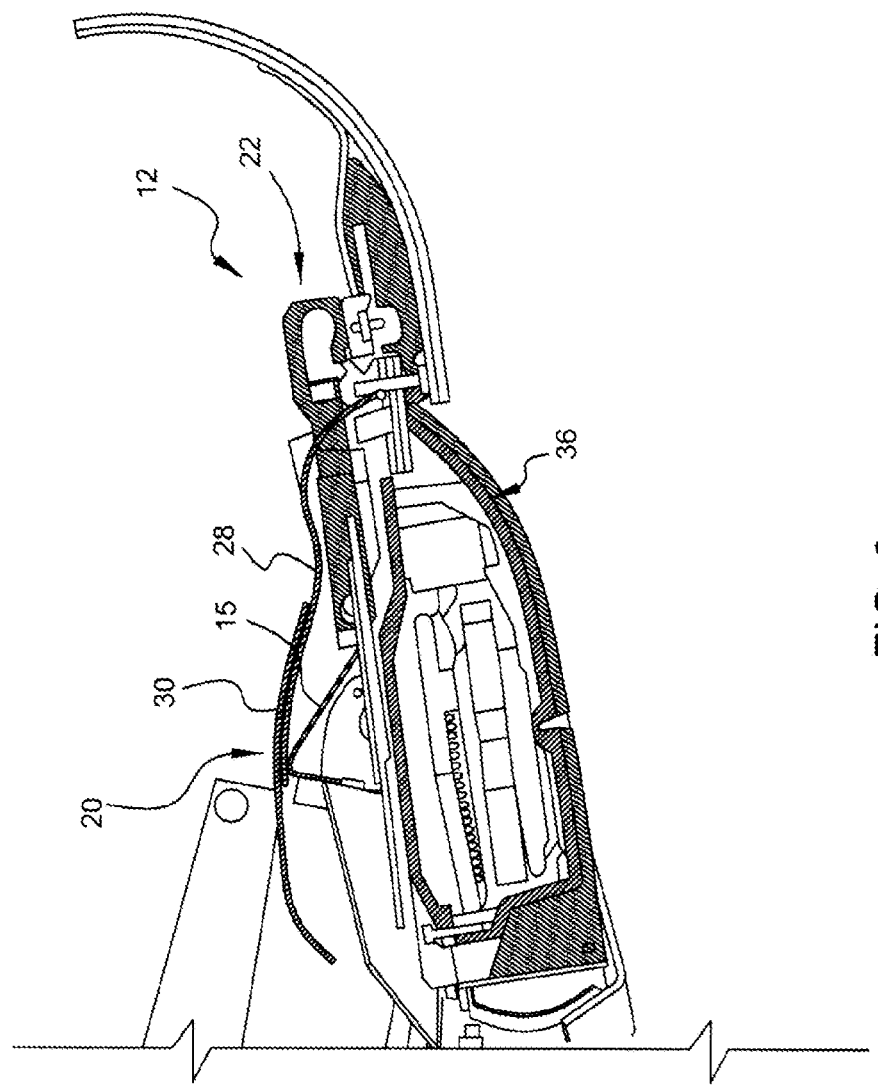
FIG. 6 is a right side cross-sectional view of the cutter guard assembly of FIG. 5 in an up position.
Figure 7:
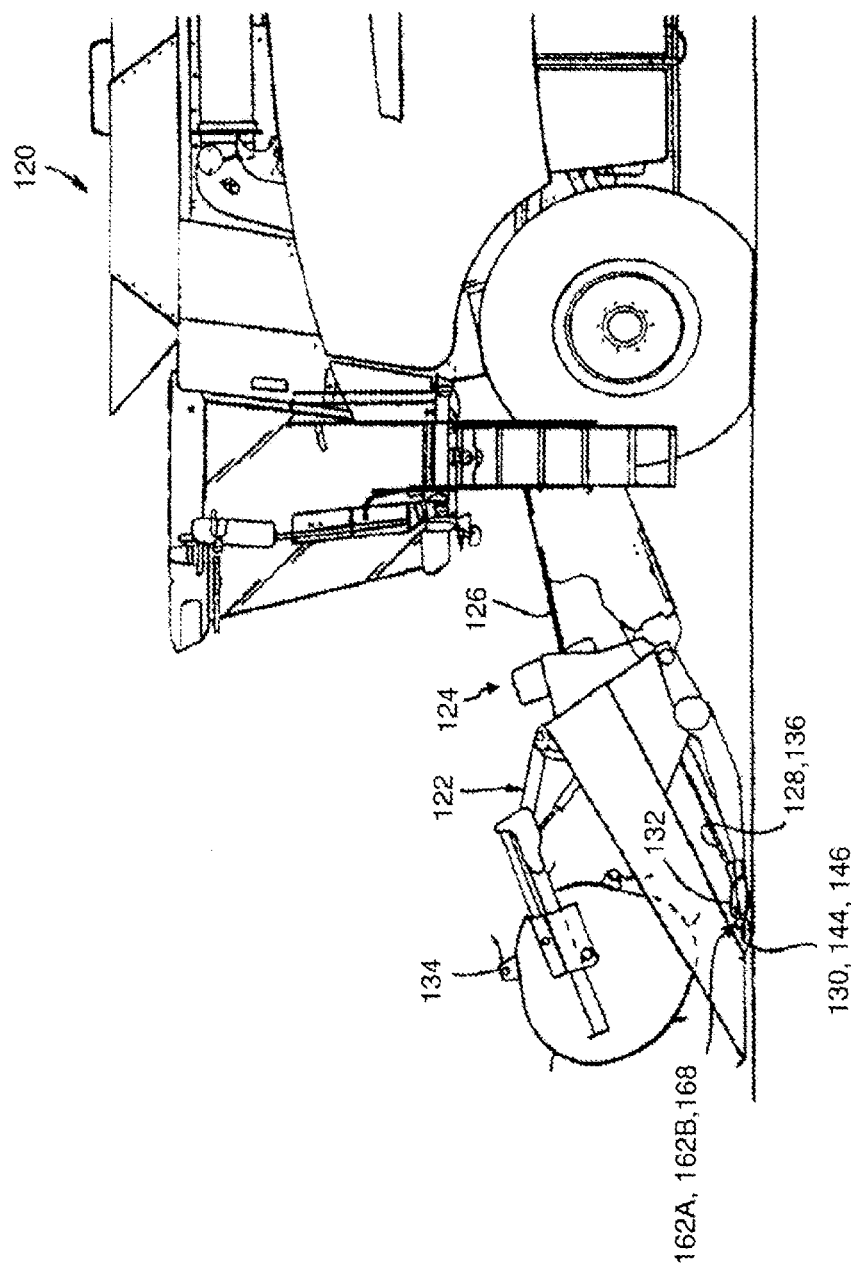
FIGS. 7-9 and 9A illustrate several examples of an agricultural equipment employing various aspects of the subject application.
Figure 8:
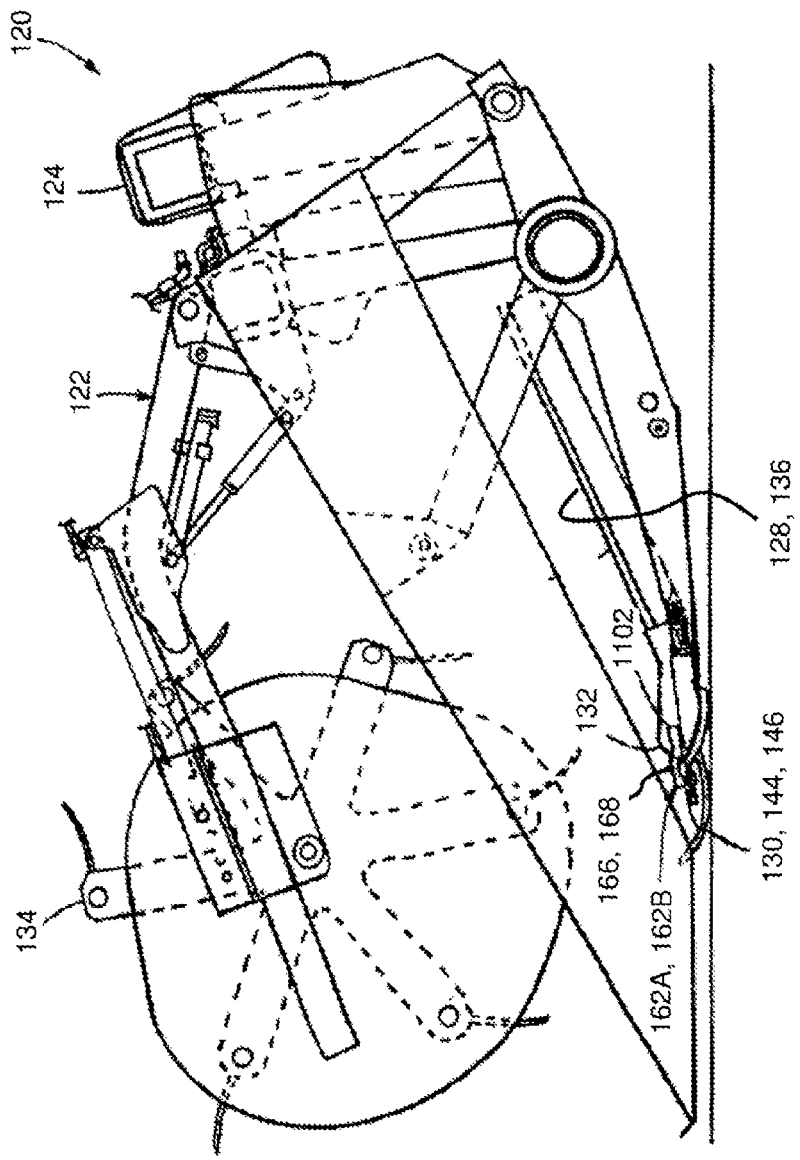

Referring now to FIGS. 2-6, the floor assembly 20 includes a floor 28 and a cover 30. The floor 28 can be comprised of a single floor sheet 32 or a plurality of floor sheets such as 32a and 32b (FIG. 2) and a center floor sheet (not shown in FIG. 2). The floor 28 is attached to the cutter bar assembly 18 about its anterior end 29 and extends rearwardly therefrom. As best shown in FIGS. 5 and 6, the floor 28 biases against a rigid frame 15 (commonly known in the art as a "Z-channel" and described in detail below) of the header 14 via a spring 34. The floor 28 can be as wide, or wider, than the cutter bar 26.

Preferably, when the floor 28 is configured as a plurality of floor sheets, the center floor sheet 32 is formed so as to be wider than a knife drive 36 of the knife drive assembly 22, which in this embodiment is a center knife drive 36. Having the center floor sheet 32 wider than the knife drive 36, and consequently the knife assembly 22, advantageously prevents waste material or debris from accumulating on the center knife drive 36 by eliminating any gaps from interface regions of the plurality of floor sheets above the center knife drive 36.

Referring to FIGS. 5 and 6, the Z-channel 15 extends in a widthwise direction of the combine 10. The Z-channel 15 is a frame member forming an anterior portion of a frame of the header 14. The Z-channel has a cross-sectional profile of a "Z". FIG. 5 illustrates the knife assembly 22 in a down position while FIG. 6 illustrates the knife assembly 22 is an up position. The knife drive assembly 22 pivots about an axis (not shown) positioned rearwardly of the knife assembly.

Referring back to FIGS. 4-6, the cover 30 extends rearwardly from the floor 28. Preferably the cover 30 extends further rearwardly than the floor 28 so as to drape over the Z-channel 15. The cover 30 is preferably a flexible cover such that when a gap opens or forms between floor 28 and the Z-channel 15 as a result of the pivoting movement of the knife assembly 22, the cover covers the resulting gap thereby preventing waste material and debris from passing through the gap between the Z-channel 15 and floor 28. Further, the cover 30 is preferably configured to be wider than the center knife drive 36 so as to cover the knife drive and provide sufficient shielding of the knife drive 36 from debris. The cover 30 covers the floor sheet 32. The cover 30 also covers the rigid frame and drapes over the rigid frame 15.

The cover 30 can be constructed out of any material suitable for its intended purpose. However, the cover 30 is preferably a flexible polymeric sheet, textile, elastomeric sheet, metal sheet or the like suitably flexible for the intend purpose of serving as a flexible cover that can drape over the Z-channel.

The cover 30 is connected to the floor 28 by a fastener. The fastener can be any fastener suitable for fastening or attaching the cover 30 to the floor 28, such as a nut and bolt, mounting bracket, adhesive, clamps, weld, etc. Preferably, the fastener is a mounting bracket 38 and more preferably a rectangular mounting bracket 38.

In operation as the combine 10 harvests crops, the floor 28, which is biased against the Z-channel 15, can pull away from the Z-channel forming a gap 27 therebetween as the knife drive assembly 22 pivots between up and down positions. Thus, in conventional cutter guard assemblies, waste material or debris can pass through the gap and accumulate on the knife drive 36 as a result of the resulting gap between the floor 28 and Z-channel 15. However, with the cover 30, the resulting gap is shielded and debris is prevented from depositing on the knife drive 36.

Referring to FIGS. 2, 3, 5 and 6, the knife drive 36 is covered by the floor assembly 20. The knife drive 36 includes a gear box 40 and a plurality of knife arms 42a and 42b operatively connected to the knife drive 36. Each knife arms 42a and 42b extends through a respective knife window 44a or 44b of the floor 28 and are further operatively connected to the knife drive 36.

The knife assembly 22 includes knife arms 42a, 42b and the knife drive 36 and is operatively connected to the cutter bar assembly 18. The knife assembly further includes a plurality of sickles or knife blades having oppositely facing, angularly related knife edges which are configured for reciprocative movement along the cutter bar 26. The knife assembly 22 is situated below the floor 28.

Turning now to the FIGS. 7-19, in accordance with various other aspects of the subject application, the present invention provides a protective encapsulation for a cutter assembly. Various aspects of the subject disclosure can be implemented as part of an agricultural cutting machine (e.g., a combine 120). Header 122 is shown supported on a forward end 124 of combine 120, and is operable for cutting or severing crops such as, but not limited to, small grains such as wheat and soybeans, and inducting the severed crops into a feeder house 126 for conveyance into combine 120 for threshing and cleaning, as combine 120 moves forwardly over a field.

Header 122 includes a pan or floor 128 which is supported in desired proximity to the surface of the field during the harvesting operation, and an elongate, sidewardly extending sickle 130 along a forward edge portion 132 of floor 128, sickle 130 being operable for severing the plants or crop for induction into header 122, as will be explained. Header 122 additionally includes an elongate, sidewardly extending reel 134 disposed above sickle 130 and rotatable in a direction for facilitating induction of the severed plant material or crops into header 122. Here, header 122 is configured as a draper type, having a system of elongate, flat, sidewardly moving draper belts 136 and 138 having upwardly facing surfaces disposed just rearwardly of forward edge portion 132, operable in cooperation with reel 134 for conveying the severed plant material or crops toward an inlet opening of feeder house 126 for induction into combine 120, in the well-known manner.

Figure 9:
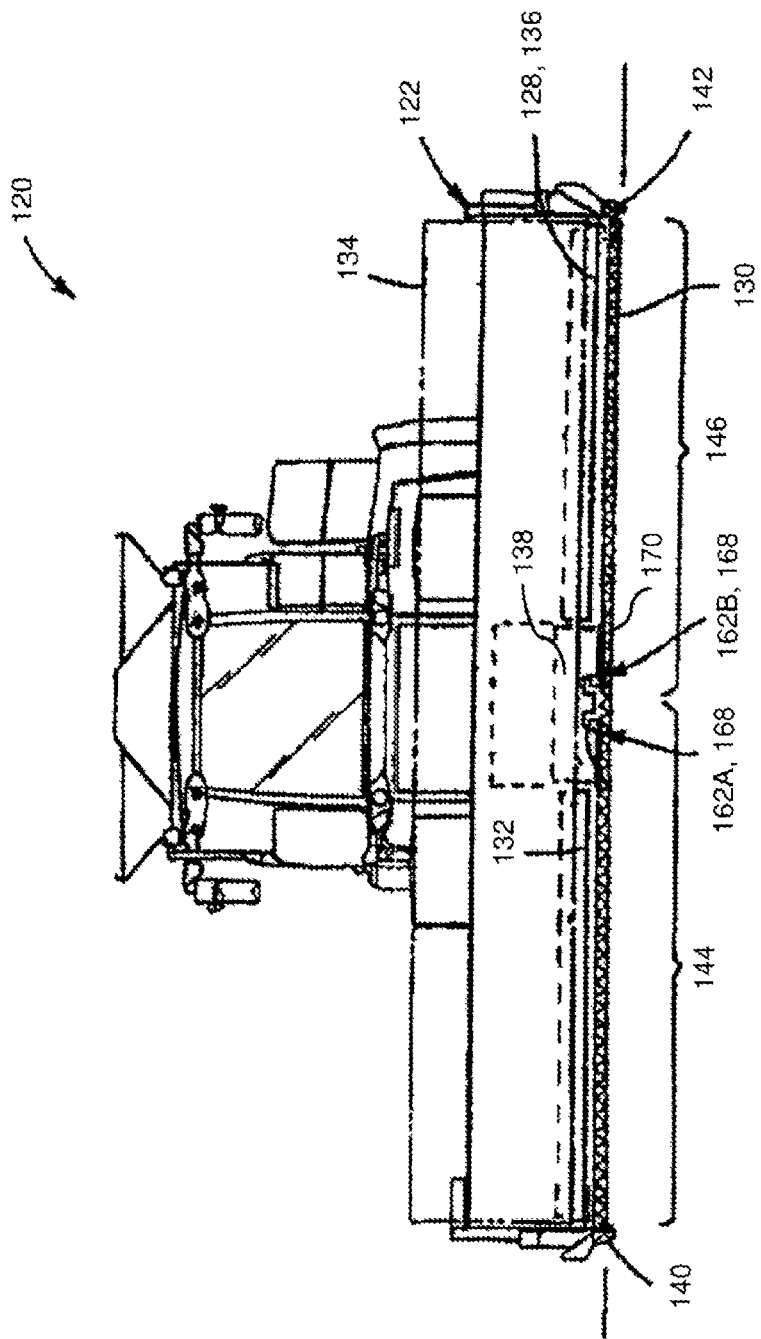

Referring more particularly to FIG. 9, sickle 130 extends in a sideward direction along the width of floor 128, between a first side edge portion 140 of the floor, and an opposite second side edge portion 142. Sickle 130 includes an elongate, sidewardly extending first cutter bar assembly 144, and an elongate, sidewardly extending second cutter bar assembly 146 extending in end to end relation to cutter bar assembly 144, cutter bar assemblies 144 and 146 being supported in substantially longitudinally aligned relation adjacent to forward edge portion 132 of floor 128.

Figure 10:
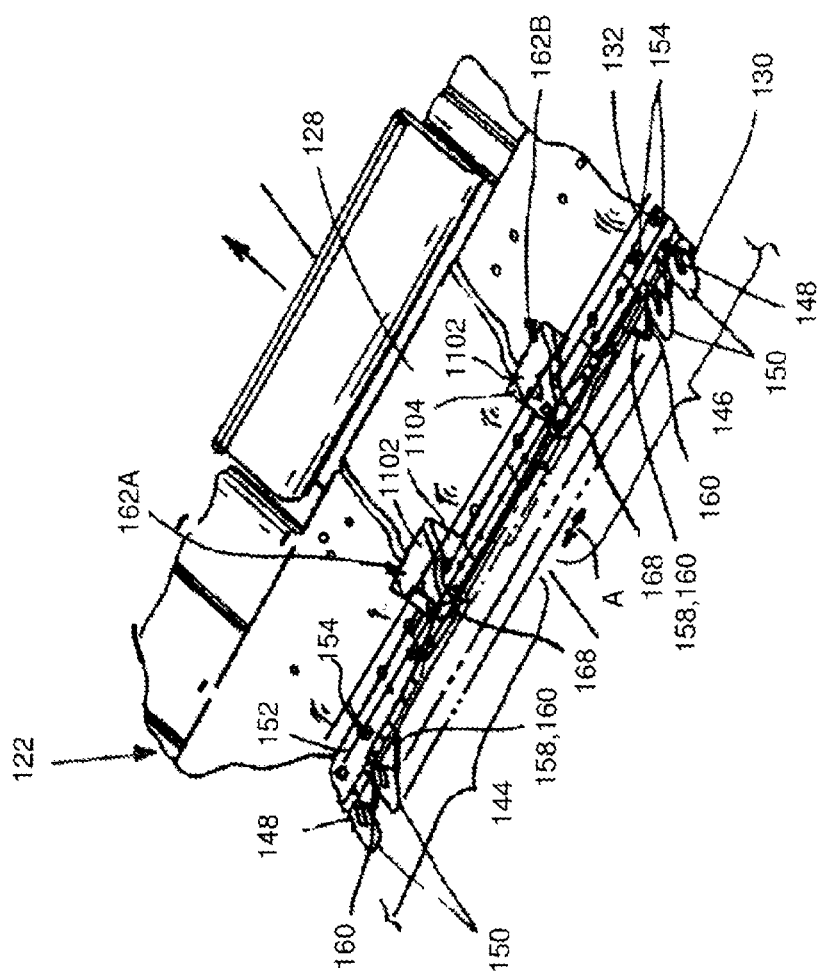
FIG. 10 illustrates a fragmentary perspective view of a header of FIG. 7, showing aspects of a sickle knife head and arm assemblies—which can employ various aspects of the subject application.
Figure 11:
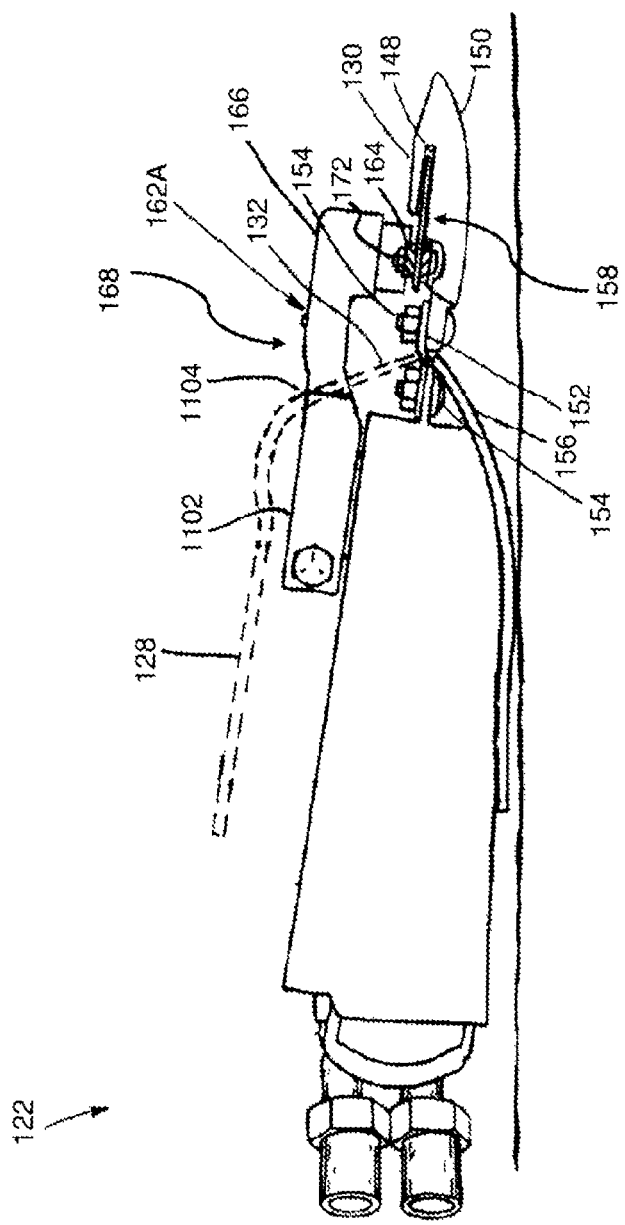
FIG. 11 illustrates an enlarged side view showing aspects of the header, sickle drives, and the sickle knife head and arm assemblies of FIG. 7, which can employ various aspects of the subject application.

Referring more particularly to FIGS. 10 and 11, cutter bar assemblies 144 and 146 each include a plurality of sidewardly facing aligned slots 148 through a sidewardly extending array of guards 150 which project forwardly from a stationary bar 152 at sidewardly spaced intervals therealong. Stationary bar 152 extends the length of sickle 130 just forwardly of forward edge portion 132 of floor 128, and guards 150 are mounted to bar 152 with fasteners 154. The stationary bar 152 is stationary in that it does not move or reciprocate like the sickles, however, the stationary bar does flex and move e.g., upwards and downwards, in response to changes in ground surface topography. Bar 152, in turn, is mounted to a gearbox 156 of header 122 adjacent to forward edge portion 132 by fasteners 154, as best illustrated in FIG. 11. However, it is contemplated that the bar 152 may alternatively be mounted to other stationary structures of the header, e.g., a portion of the header frame/chassis. Each of cutter bar assemblies 144 and 146 supports an elongate knife assembly 158 for reciprocating longitudinal movement within slots 148, each knife assembly 158 having a row of knife sections 160 including oppositely facing, angularly related knife edges which, in conjunction with adjacent guards 150, effects a shearing or cutting action which severs plant stems and stalks or other material captured between the knives and the guards as the knife sections are reciprocatingly moved sidewardly, as denoted by arrow A in FIG. 10.

Knife assemblies 158 are reciprocatingly driven utilizing first and second sickle drives 162A and 162B similar to knife drive 36 described above. First and second sickle drives 162A and 162B are illustrated in FIGS. 9 and 10 at a center location on header 122 between side edge portions 140 and 142 at the opposite ends of the header, although it should be noted that it is contemplated that sickle drives 162A and 162B could alternatively be utilized at other locations on a header, and that multiple sickle drives could be used at multiple locations on a header. Sickle drives 162A and 162B are preferably located completely within or beneath floor 128 or beneath a level of the floor 128 as best shown in FIG. 11, to reduce interruption of flow of cut plant material thereover and thereabout. Drives 162A and 162B can comprise a variety of mechanisms, such as, but not limited to, epicyclical drives that impart purely linear sideward motion, or pivoting sideward motion, to the knife head assemblies, as desired or required for a particular application. The disclosures and teachings of Priepke U.S. Pat. Nos. 7,810,304; 7,805,919; 7,730,709; 7,520,118; and 7,401,458, and Bich U.S. Pat. No. 8,011,272 are hereby incorporated by reference herein in their entireties, as representative non-limiting examples of drives that can be utilized with the present invention.

Sickle knife arms 162A and 162B include drive elements 1102 that project forwardly through slots 1104 or other openings in or in the vicinity of forward edge portion 132 of floor 128, for connection to the respective knife assemblies 158, and which are moved in a side to side reciprocating motion by the respective knife drive, for effecting the cutting action. Header 122 includes knife drive assemblies 168 having knife heads 164 and knife arms 166 cooperatively arranged, constructed and operable according to the present invention, connecting drives 162A and 162B in driving relation with respective knife assemblies 158. As is evident from the location of knife heads and knife arms, they will be located directly in the path of the rearward flow of cut plant material over forward edge 132 and onto the upper surface of floor 128 during plant cutting operations. As a result, if the knife heads and knife arms 164, 166 are large and/or obtrusive, they can have a plowing effect, causing the plant material to build up forwardly thereof, and/or be split or interrupted, so as to not flow smoothly onto the floor. It is therefore desired to minimize such flow disruptions.

Figure 9A:
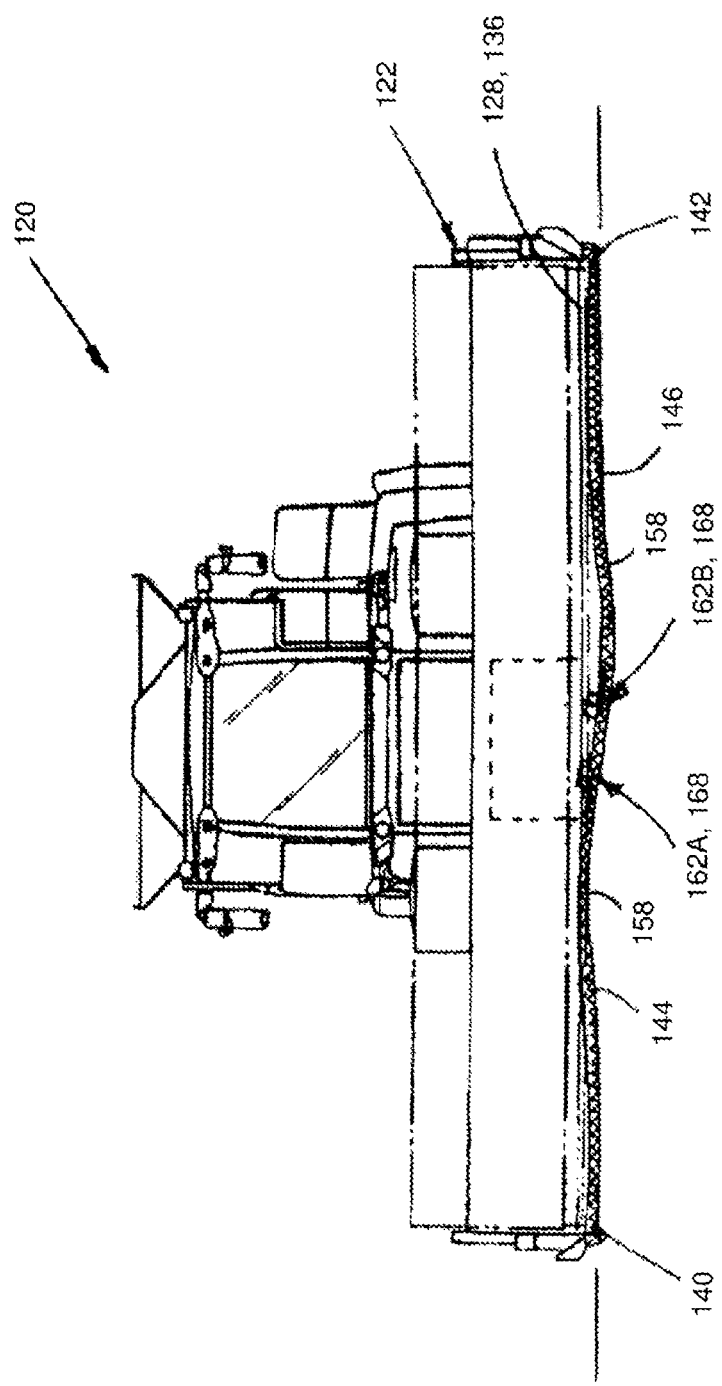

Additionally, the drive 162A or 162B and the knife assemblies 158 are configured to allow for a limited amount of relative vertical movement therebetween to facilitate free reciprocating movement of the knife assemblies, both to accommodate knife wear and flexing if so configured, as illustrated by the flexed cutter bar assemblies 144 and 146, in FIG. 9A.

Figure 12:
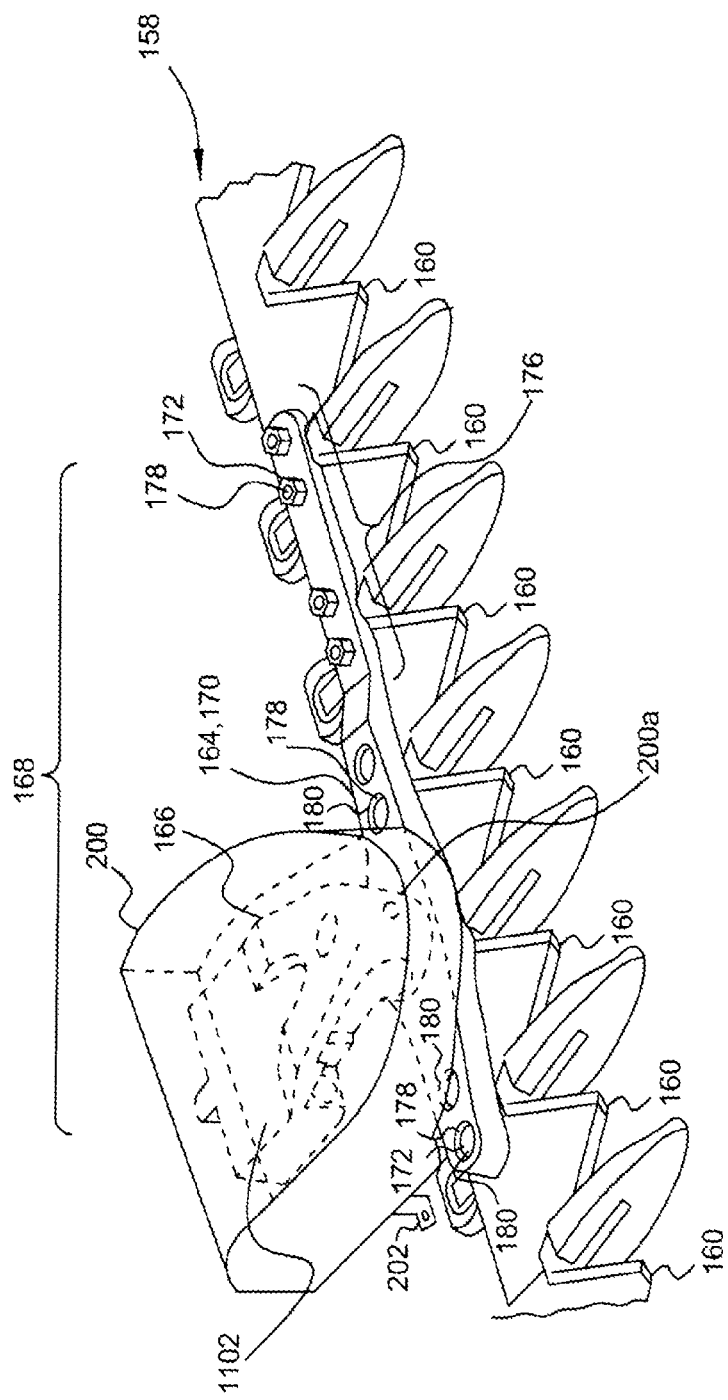
FIG. 12 illustrates a fragmentary perspective view of the sickle of FIG. 7, showing one of the knife head and arm assemblies employing a protective boundary/protective encapsulation of the subject application.
Figure 15:
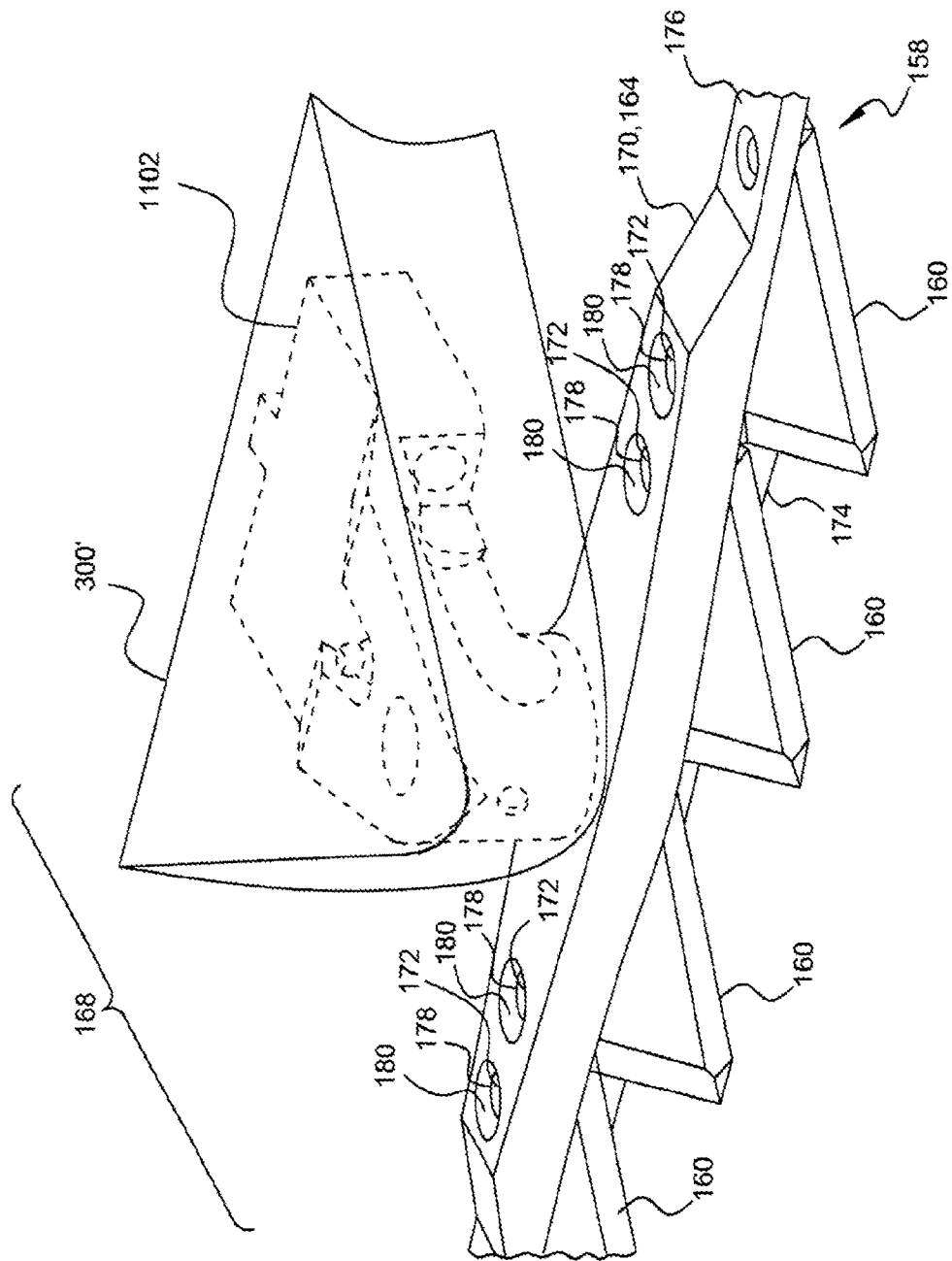

Referring to FIGS. 11, 12 and 15, knife head 164 and arm 166 each comprise an elongate member 170 attached by an array of threaded fasteners 172 to an elongate structural beam 174 underlying the respective knife drive assembly 168 of the sickle cutter. Several of knife sections 160 of the respective knife drive assembly 168 are disposed between beam 174 and member 170, so as to be clamped or captured by this attachment, while the other knife sections 160 of the knife drive assembly are mounted using additional fasteners 172 for direct attachment to beam 174. Features of knife head 164 include controlled or limited vertical flexibility, which provides an ability to bend or flex to a limited extent with portions of a sickle attached thereto. This capability is preferably achieved by reducing the vertical height or extent of at least one longitudinal end 176 of member 170 relative to a middle or opposite end, resulting in e.g., a stepped shape, although it should be recognized that a tapered or other shape that imparts desired flexibility can alternatively be used. Fasteners 172 here comprise bolts which are inserted from below and extend upwardly through mating holes in beam 174, knife sections 160 and knife head 164, at the top of which they threadedly engage nuts 178. On end 176, nuts 178 are located on top of member 170. On the thicker region, nuts 178 are located in upwardly facing sockets 180 recessed into the top surface of member 170, such that the same length fasteners 172 can be used at both locations if desired. Fasteners 172 are arranged in a spaced apart longitudinally extending array, and are provided in sufficient number, e.g., eight or more, to provide secure attachment to beam 174 for clamping or capturing knife sections 160, and for withstanding shear loads generated by the side to side cutting motion and reciprocating action, which will be longitudinal with respect to member 170.

Referring back to FIG. 12, there is illustrated an exemplary protective boundaries/protective encapsulation 200 (e.g., partial encapsulation) in accordance with various aspects of the subject application. The protective encapsulation 200 is a stationary protective encapsulation and configured as a substantially hollow cover that bounds a top portion, a front portion, and side portions of the knife arm 166 and drive element 1102. In other words, the protective encapsulation 200 is a hollow cover having a top side, opposing lateral sides, and a front side, without a bottom side and sized to receive and cover the knife arm 166 and drive element 1102 therein while allowing sufficient spacing for the reciprocal movement of the knife arm and drive element. That is, a front end of the protective encapsulation is open at the bottom to allow the knife assembly to attach to the knife arm 166. As the protective encapsulation 200 spans the longitudinal length of the knife arm 166 and drive element 1102, the protective encapsulation extends from underneath the floor 128 and out through opening 1104 (see e.g., FIGS. 14 and 18).

The protective encapsulation 200 is also configured to have a curved front end 200a sized and shaped to allow the knife arm 166 to reciprocate therein without contacting the inner surfaces of the protective capsulation. The protective encapsulation 200 can also be configured with a top backside having a convex curved surface geometry that matches the cut out of the floor opening 1104 and extends through the opening 1104 (see e.g., FIGS. 17 and 18) such that as the floor flexes relative to the cutter bar assembly 144, no gaps or minimized gaps form between the protective encapsulation and floor about its opening 1104. That is, the protective encapsulation 200 can be configured to have a curved top backside having a cross-sectional curved surface geometry that matches a curve defined by a front end 128a of the floor as it flexes or pivots about an axis.

The protective encapsulation 200 is a stationary cover that can be bolted to a statutory segment of the cutter bar assembly 144 or 146 or to bar 152, by for example a screw or a nut and bolt assembly via e.g., fastener bracket 202. In sum, the protective encapsulation covers the knife arm extending forwardly of the floor.

Figure 13:
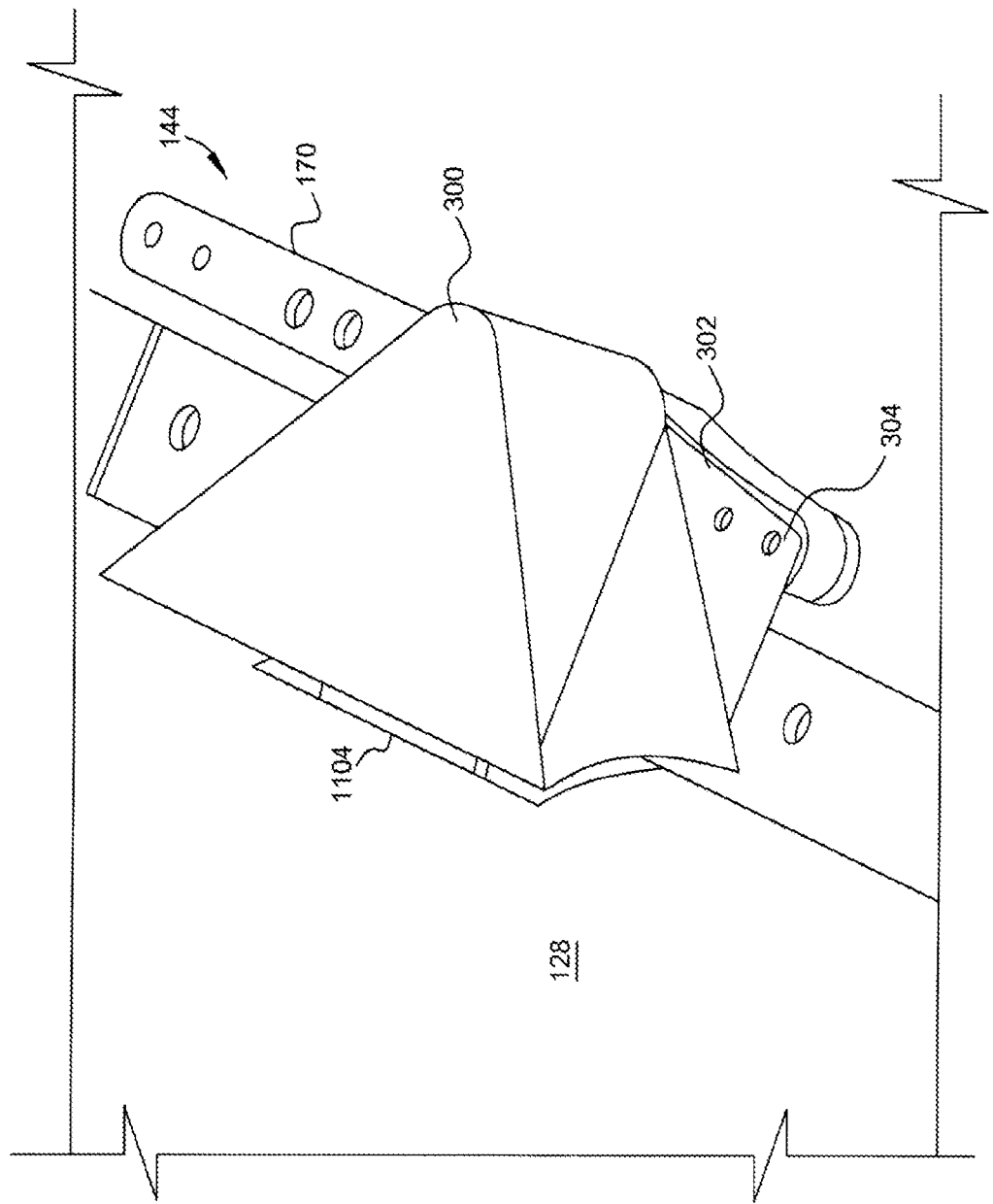
FIG. 13 illustrates a fragmentary perspective view of the sickle of FIG. 7, showing one of the knife head and arm assemblies having a protective boundary/encapsulation in accordance with another aspect of the subject application.
Figure 14:
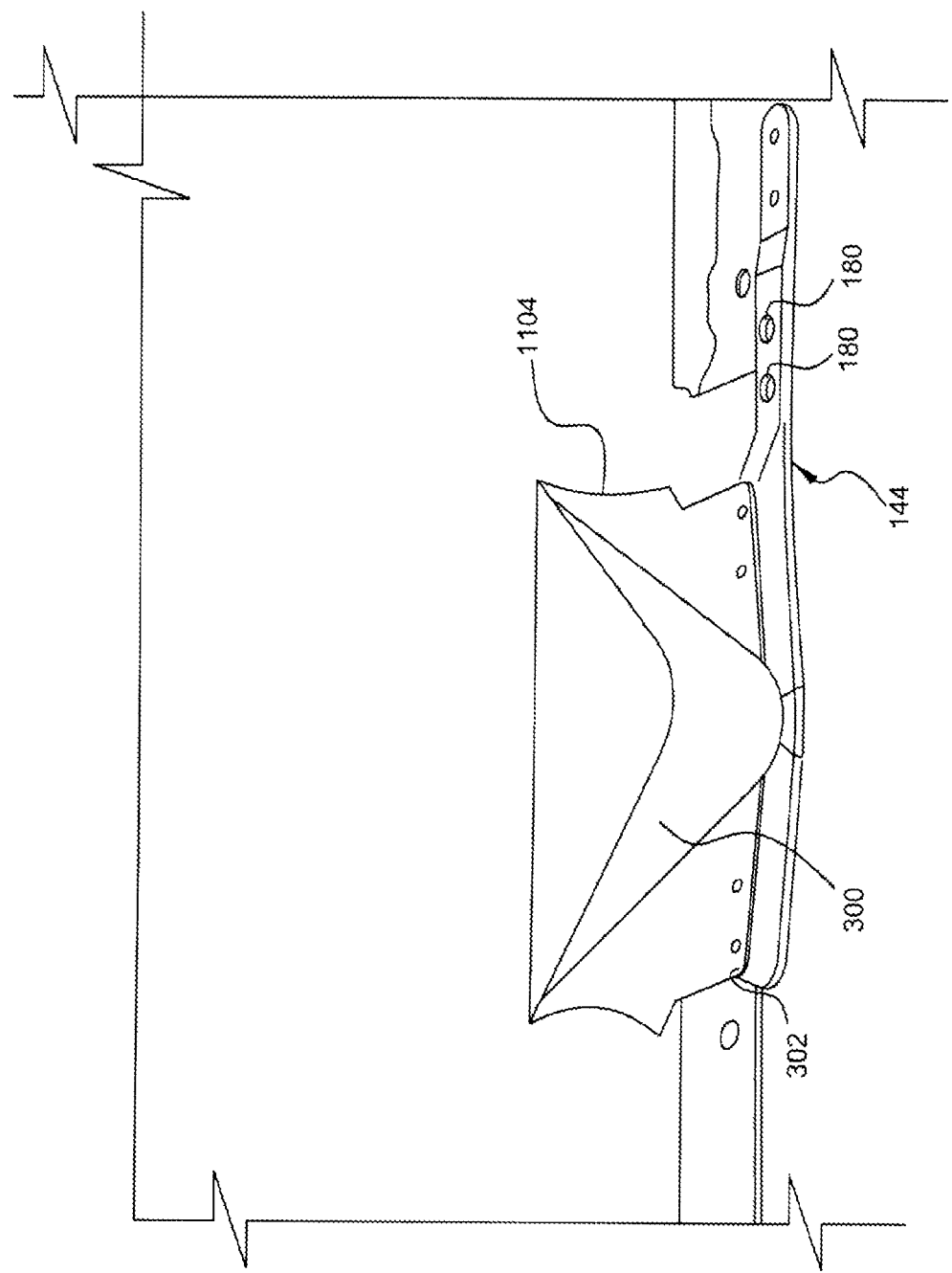
FIGS. 14-19 illustrate various aspects of the protective boundary/protective encapsulation of the subject application.

Referring to FIGS. 13 and 14, in accordance with another preferred embodiment, the protective encapsulation 300 is configured as a moving cover or movable cover i.e., a mobile protective encapsulation. The protective encapsulation 300 is similar to the protective encapsulation 200 in that it includes a substantially hollow cover that bounds a top portion, a front portion, and side portions of the knife arm 166 and a portion of the drive element 1102. However, the protective encapsulation 300 is shaped to have a substantially triangular shaped configuration with three protective boundary sides. Specifically, the sides of the protective encapsulation terminate and an apex and extends rearwardly from the cutter bar assembly 144 so as to sit flush or adjacent to the opening 1104 of the floor 128. The front end of the protective encapsulation 300 is sized sufficiently to allow the front end of the knife arm 166 to be received therein but sufficiently fitted such that the effective encapsulation moves or reciprocates coincidentally with the reciprocal motion of the knife arms during operation. Further, the mobile protective encapsulation 300 has its front portion i.e., its front end or distal end attached to a segment of the cutter bar assembly 144. For example, the front end of the protective encapsulation can be configured with outwardly exchanging flaps 302 having openings aligned with openings 304 on a segment of the cutter bar assembly 144, such as member 170 for attaching thereto by fasteners e.g., a threaded screw or a nut and bolt assembly.

In a further alternative example, the protective encapsulation 300' can be configured as shown in FIG. 15, such that its rear portion covers the drive element 1102. The protective encapsulation 300' is attached to a segment of the cutter bar assembly 144 similar to protective encapsulation 300, e.g., via a fastener extending through a flap 302'.

Figure 16:
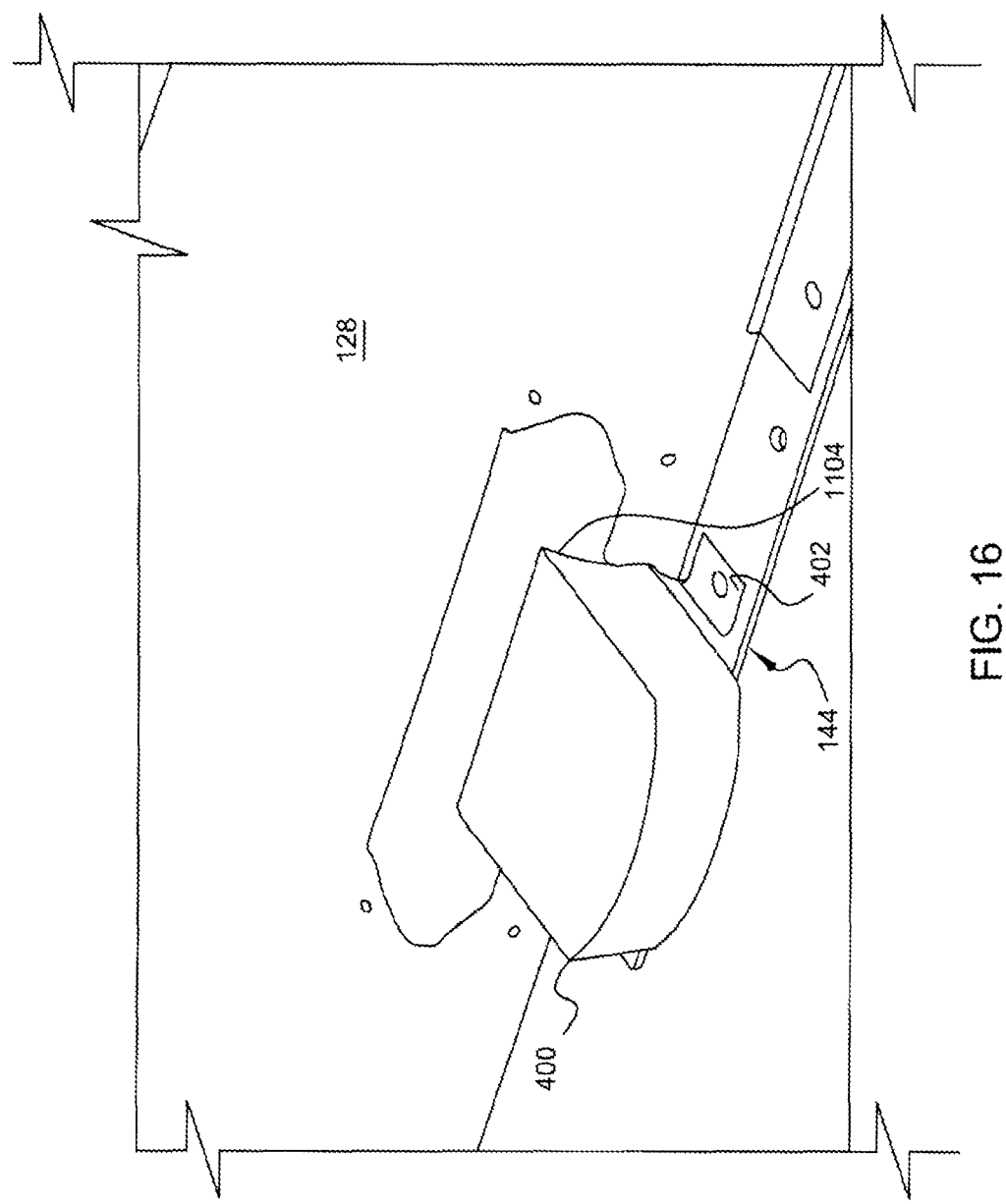
Figure 17:
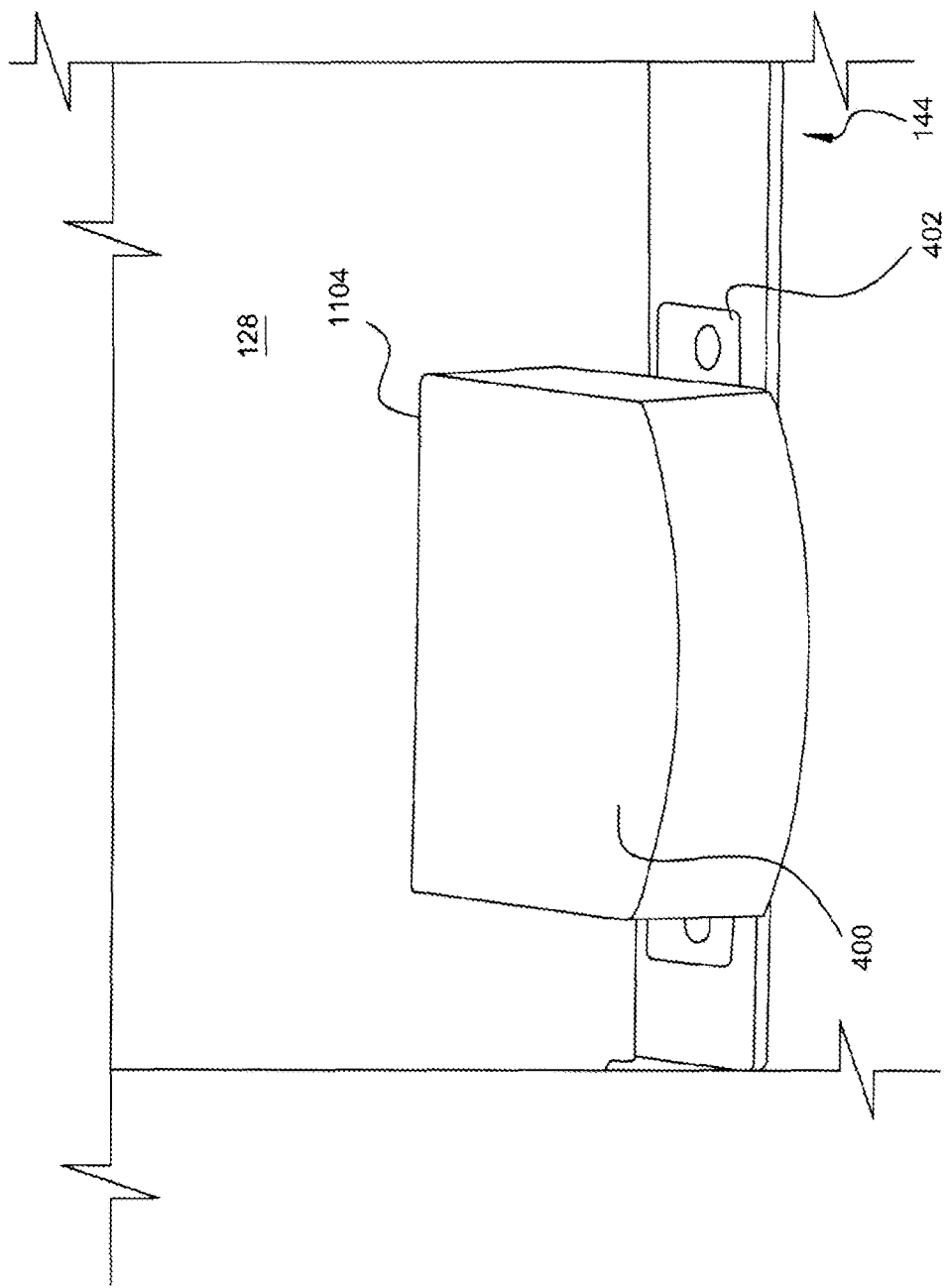
Figure 18:
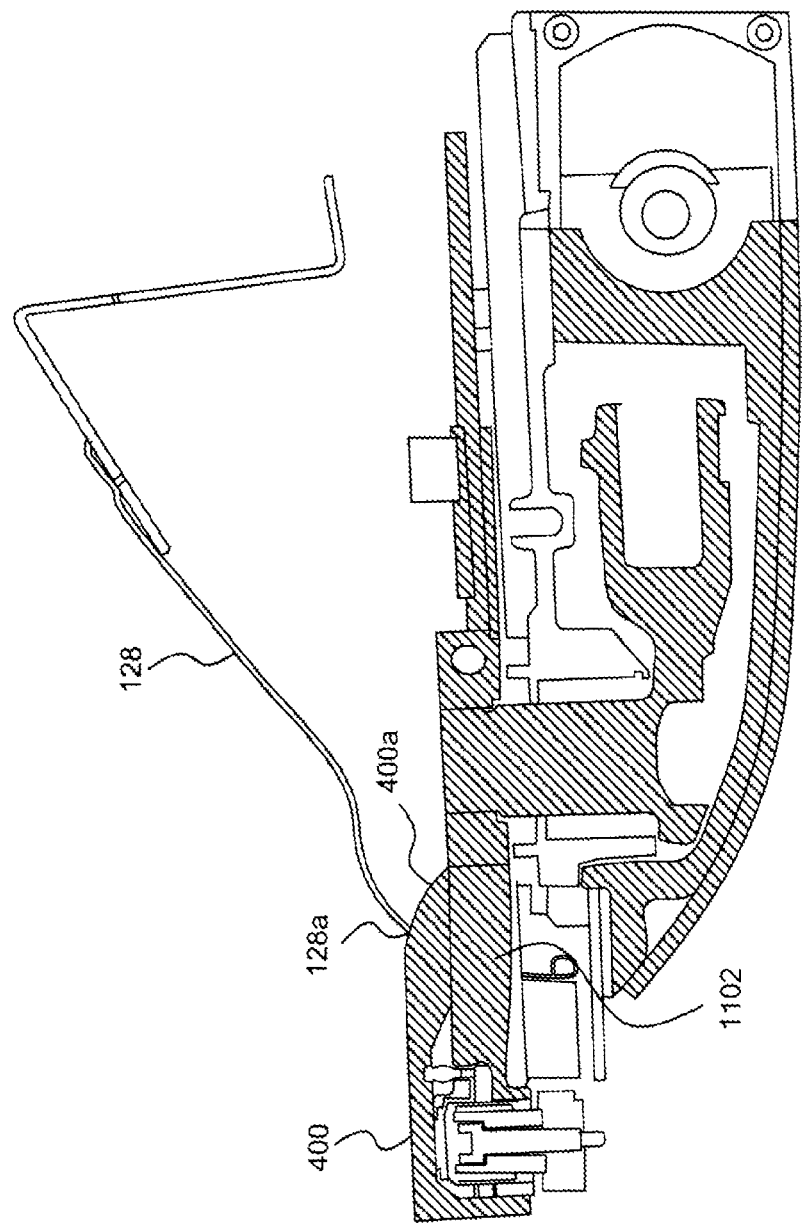
Figure 19:
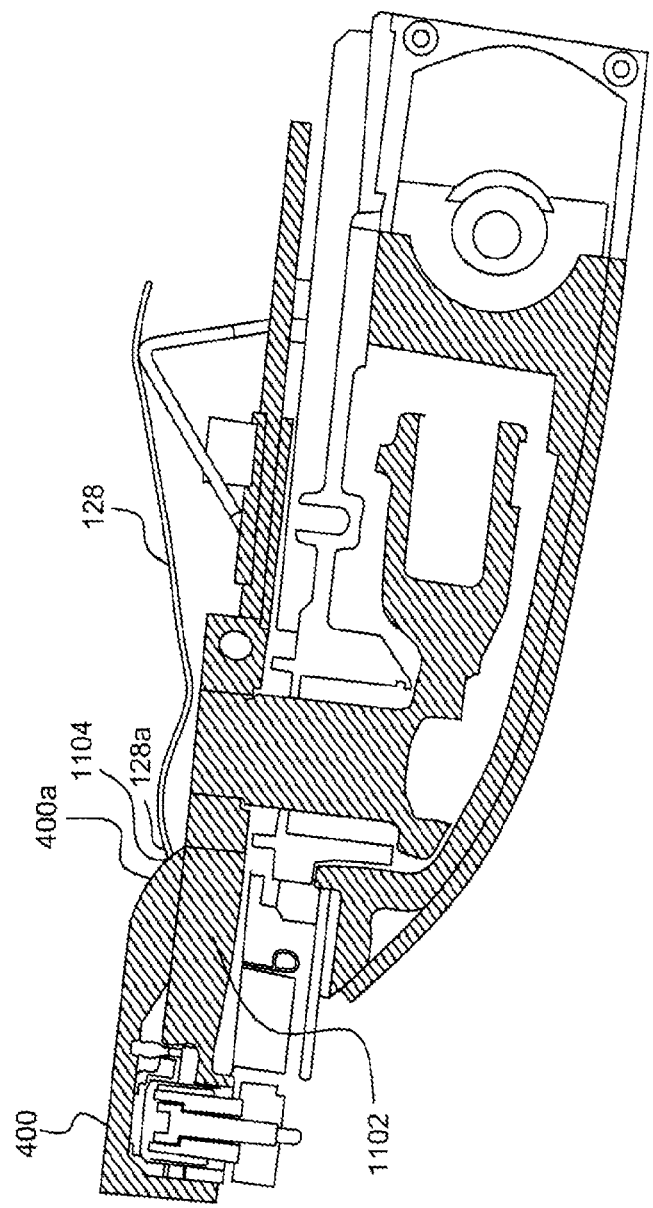

In accordance with another preferred embodiment, the protective encapsulation can be configured as a stationary protective encapsulation 400, as shown in FIGS. 16-18. The protective encapsulation 400 is configured as a substantially hollow cover having a top side, substantially parallel lateral sides and a curved front side, and sufficiently sized to receive the knife arm 166 therein while allowing the knife arm to freely move and reciprocate therein without contacting the internal surfaces of the protective encapsulation. A front portion of the protective encapsulation is attached to a segment of the cutter bar assembly 144 via flaps 402 extending outwardly from each lateral side of the protective encapsulation. The flaps 402 are configured with apertures for allowing a fastener e.g., a threaded screw or a nut and bolt assembly, to attach the flaps to the cutter bar assembly 144. Preferably, the top and lateral sides of the protective encapsulation extend rearwardly of the knife arm to substantially cover the drive element 1102, as best shown in FIGS. 18 and 19.

Similar to protective encapsulation 200, protective encapsulation 400 is configured with a back topside 400a having a convex curved surface geometry that matches the cut out of the floor opening 1104 and extends through the floor opening 1104 such that as the floor 128 flexes relative to the cutter bar assembly 144, no gaps or minimized gaps form between the protective encapsulation and floor about its opening 1104. That is, the top backside 400a has a cross-sectional curved surface geometry that matches or substantially matches a curve defined by a front end 128a of the floor 128 as it flexes or pivots about an axis (not shown). The curved surface geometry of the back topside 400a slidingly engages or is slightly spaced apart from the front end 128a of the floor. FIG. 18 illustrates the cutter bar assembly 144 in a down position with the floor 128 in a first position having its front end 128a situated about an upper region of the curved back topside 400a. FIG. 19 illustrates the cutter bar assembly 144 in an up position with the floor 128 and a second position or a flexed position having its front end 128a situated about a lower region of the curved back topside 400a.

In light of all the foregoing, it should thus be apparent to those skilled in the art that there has been shown and described a cutter guard assembly cover and protection encapsulation. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

We claim:

1. A header for an agricultural farm implement comprising:
   a rigid frame;
   a cutter bar assembly adjacent the rigid frame;
   a knife assembly operatively connected to the cutter bar assembly, the knife assembly including a knife arm;
   floor assembly including a floor extending rearwardly from the cutter bar assembly; and
   a protective encapsulation covering the knife arm, the protective encapsulation having a backside with a curved surface geometry that substantially matches a curve defined by a front end of the floor as it flexes or pivots.

2. The header according to claim 1, wherein the protective encapsulation is a substantially hollow cover that bounds a top portion, a front portion, and side portions of the knife arm.

3. The header according to claim 1, wherein the protective encapsulation is a mobile protective encapsulation having a front portion attached to a segment of the cutter bar assembly.

4. The header according to claim 1, further comprising a cover extending from the floor and covering the rigid frame.

5. The header according to claim 4, wherein the cover is a flexible cover.

6. The header according to claim 4, wherein the cover is a polymeric sheet, textile, elastomeric sheet, or metal sheet.

7. The header according to claim 4, wherein the cover drapes over the rigid frame.

8. The header according to claim 4, wherein the knife assembly further includes a knife drive and the cover is wider than the knife drive.

9. The header according to claim 8, wherein the cover further covers the knife drive.

10. The header according to claim 4, wherein the cover further covers a floor sheet of the floor.

11. The header according to claim 1, wherein the protective encapsulation covers the entire knife arm.

12. The header according to claim 3, wherein the mobile protective encapsulation moves or reciprocates coincidentally with reciprocal motion of the knife arm.

13. A header for an agricultural farm implement comprising:
    a rigid frame;
    a cutter bar assembly mounted to the header adjacent the rigid frame;
    a knife assembly operatively connected to the cutter bar assembly, the knife assembly including a knife arm; and
    a floor assembly including a floor extending rearwardly from the cutter bar assembly; and
    a protective encapsulation covering the knife arm extending forwardly of the floor,
    wherein the protective encapsulation has a curved top backside with a cross-sectional curved surface geometry that matches a curve defined by a front end of the floor as it flexes or pivots about an axis.

14. A header for an agricultural farm implement comprising:
    a rigid frame;
    a cutter bar assembly mounted to the header adjacent the rigid frame;
    a knife assembly operatively connected to the cutter bar assembly, the knife assembly including a knife arm;
    a floor assembly including a floor extending rearwardly from the cutter bar assembly; and
    a protective encapsulation covering the knife arm, the protective encapsulation having a curved top backside with a curved surface geometry that substantially matches a curve defined by a front end of the floor as it flexes or pivots about an axis.

15. The header of claim 14, wherein the protective encapsulation is a mobile protective encapsulation having a front portion connected to the cutter bar assembly.

16. The header of claim 14, further comprising a cover extending from the floor and covering the rigid frame.

17. The header of claim 14, wherein the protective encapsulation covers the entire knife arm.

18. The header of claim 13, wherein the protective encapsulation is a mobile protective encapsulation having a front portion attached to the cutter bar assembly.

19. The header of claim 13, further comprising a cover extending from the floor and covering the rigid frame.

20. The header of claim 13, wherein the protective encapsulation covers the entire knife arm.

* * * * *